(12) United States Patent
Patrascu et al.

(10) Patent No.: US 7,533,756 B2
(45) Date of Patent: May 19, 2009

(54) PROPSHAFT ASSEMBLY WITH ANTI-NODE DAMPING INSERT

(75) Inventors: Dumitru F. Patrascu, West Bloomfield, MI (US); Zhaohui Sun, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 12/009,154

(22) Filed: Jan. 16, 2008

(65) Prior Publication Data

US 2008/0115999 A1 May 22, 2008

Related U.S. Application Data

(63) Continuation of application No. 11/184,708, filed on Jul. 19, 2005, now Pat. No. 7,320,381.

(51) Int. Cl.
*F16C 3/00* (2006.01)
(52) U.S. Cl. ........................................ 180/381; 464/180
(58) Field of Classification Search ................. 180/381, 180/380, 379, 378; 464/179, 180, 183; 188/372, 188/379
See application file for complete search history.

(56) References Cited

U.S. PATENT DOCUMENTS

| | | | |
|---|---|---|---|
| 1,897,542 A * | 2/1933 | West ............................... | 464/7 |
| 2,001,166 A * | 5/1935 | Swennes ...................... | 464/180 |
| 2,751,765 A | 6/1956 | Rowland et al. | |
| 3,075,406 A | 1/1963 | Butler et al. | |
| 3,592,884 A | 7/1971 | Williams | |
| 3,659,434 A | 5/1972 | Wolfe | |
| 4,014,184 A | 3/1977 | Stark | |
| 4,124,928 A | 11/1978 | Stark | |
| 4,530,379 A | 7/1985 | Policelli | |
| 4,909,361 A * | 3/1990 | Stark et al. ................... | 188/268 |
| 5,326,324 A | 7/1994 | Hamada | |
| 5,397,272 A * | 3/1995 | Smiley et al. ............... | 464/181 |
| 5,904,622 A | 5/1999 | Breese et al. | |
| 5,924,531 A | 7/1999 | Stark et al. | |
| 6,010,407 A | 1/2000 | Ishikawa | |
| 6,023,830 A | 2/2000 | Cole et al. | |
| 6,234,911 B1 * | 5/2001 | Breese et al. ............... | 464/183 |
| 6,245,408 B1 * | 6/2001 | Bitzer ......................... | 428/118 |
| 6,370,756 B1 * | 4/2002 | Conger et al. ................. | 29/423 |
| 6,409,606 B1 | 6/2002 | Nakajima et al. | |
| 6,428,017 B1 | 8/2002 | Galonska et al. | |
| 6,544,623 B1 * | 4/2003 | Straza .......................... | 428/116 |
| 6,752,722 B2 * | 6/2004 | Armitage et al. ............. | 464/180 |

(Continued)

FOREIGN PATENT DOCUMENTS

GB 2202029 A 9/1988

*Primary Examiner*—John Q. Nguyen
*Assistant Examiner*—Timothy Wilhelm
(74) *Attorney, Agent, or Firm*—Harness, Dickey & Pierce, P.L.C.

(57) ABSTRACT

A propshaft assembly includes a shaft structure having a hollow cavity and an insert member being positioned within the hollow cavity and engaging the shaft structure. The shaft structure vibrates in response to receipt of an input of a predetermined frequency such that a shell mode anti-node is generated. The insert member is located at a position that approximately corresponds to the anti-node and has a compressive strength that is tailored to an anticipated displacement of the anti-node to thereby attenuate vibration of the shaft structure.

11 Claims, 6 Drawing Sheets

U.S. PATENT DOCUMENTS

| | | | |
|---|---|---|---|
| 6,874,228 B2 * | 4/2005 | Armitage et al. | 29/888 |
| 6,877,774 B2 * | 4/2005 | Banyas | 280/777 |
| 7,083,523 B2 * | 8/2006 | Haile et al. | 464/180 |
| 2005/0026707 A1 * | 2/2005 | Tomonelli | 464/180 |
| 2005/0049054 A1 * | 3/2005 | Laskey et al. | 464/180 |
| 2005/0167963 A1 * | 8/2005 | Jurik et al. | 280/777 |
| 2005/0215331 A1 * | 9/2005 | Campbell | 464/181 |
| 2006/0208397 A1 * | 9/2006 | Ichikawa | 264/631 |

* cited by examiner

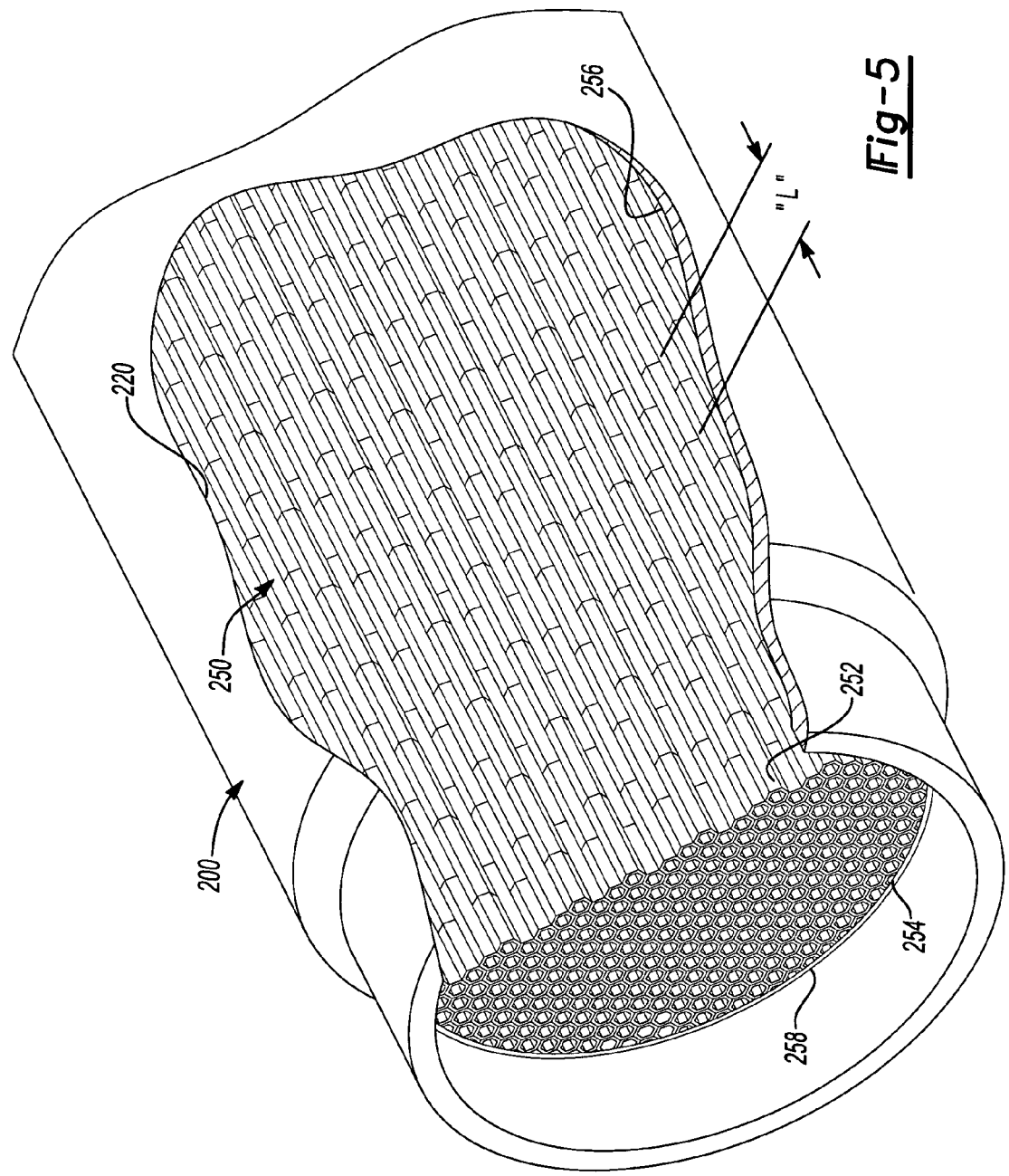

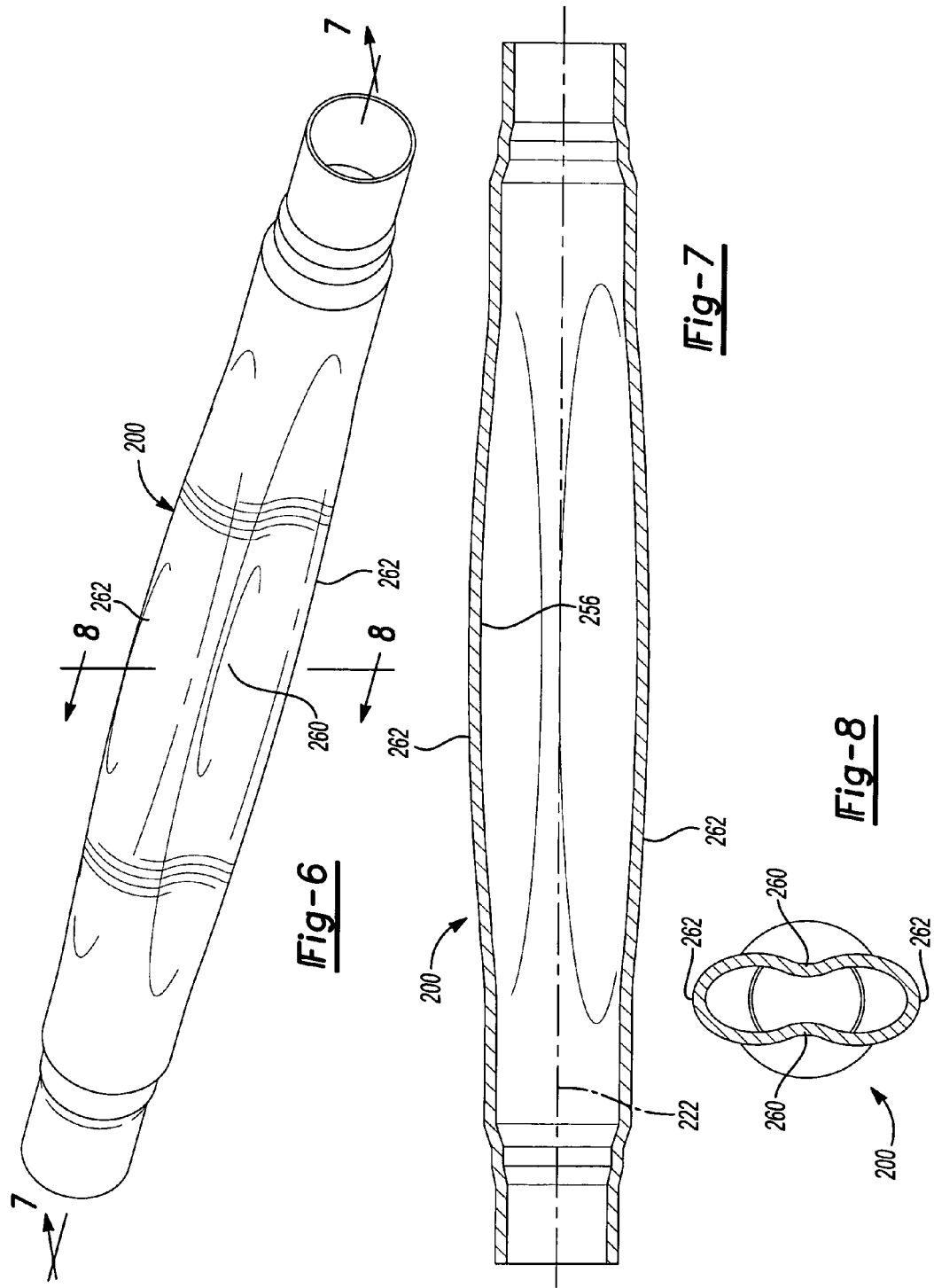

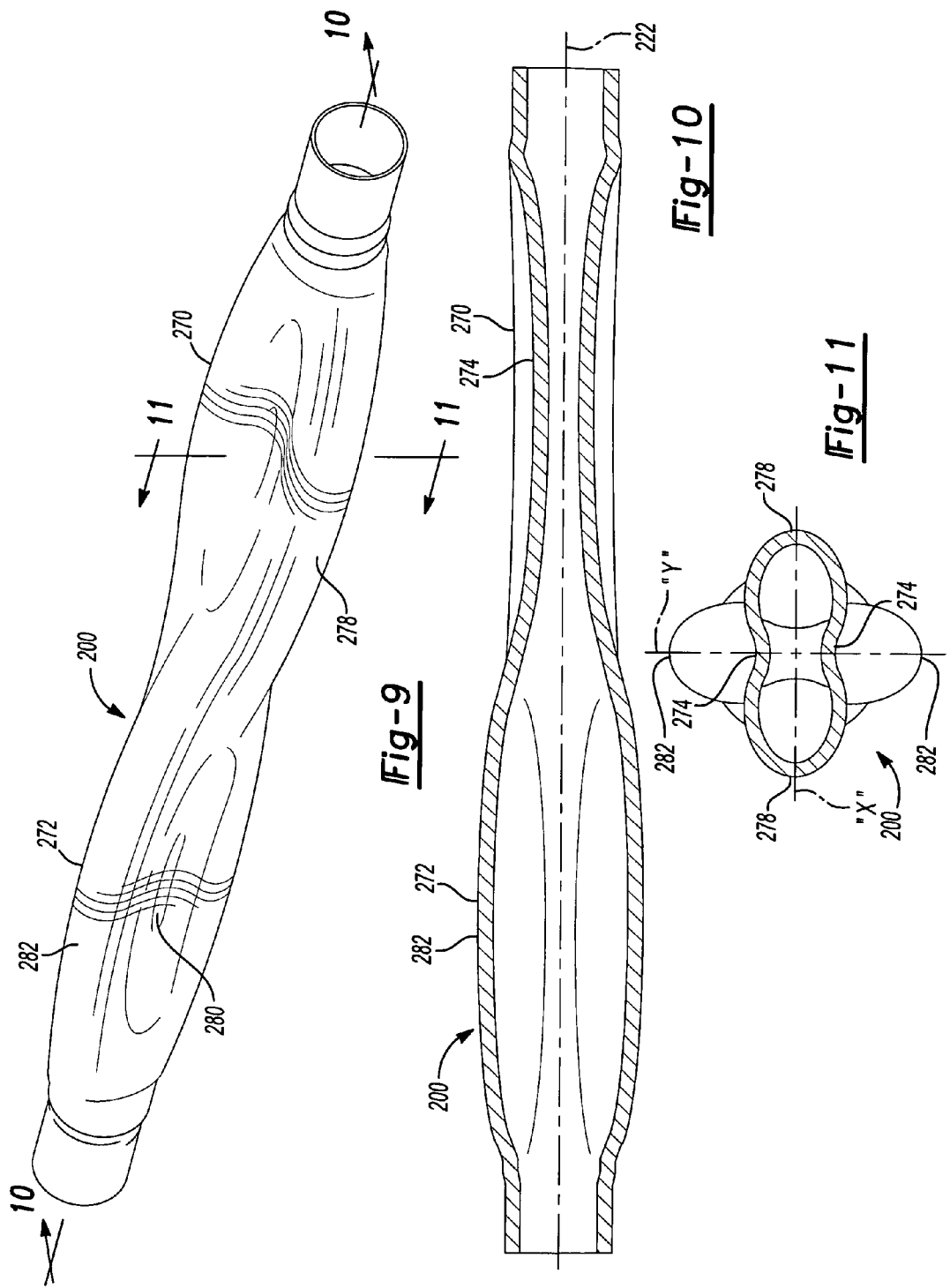

PROPSHAFT ASSEMBLY WITH ANTI-NODE DAMPING INSERT

CROSS-REFERENCE TO RELATED APPLICATIONS

This application is a continuation of co-pending U.S. patent application Ser. No. 11/184,708 filed Jul. 19, 2005. The disclosure of the above application is incorporated herein by reference.

FIELD OF THE INVENTION

The present invention generally relates to vibration attenuation in vehicle drivelines and, more particularly, to an improved noise attenuating propshaft and a method for its construction.

BACKGROUND OF THE INVENTION

Propshafts are commonly employed for transmitting power from a rotational power source, such as the output shaft of a vehicle transmission, to a rotatably driven mechanism, such as a differential assembly. As is well known in the art, propshafts tend to transmit vibration while transferring rotary power. When the propshaft is excited at a harmonic frequency, vibration and noise may be amplified, creating disturbances that are undesirable to passengers riding in the vehicle. Thus, it is desirable and advantageous to attenuate vibrations within the propshaft in order to reduce noise within the vehicle passenger compartment.

Various devices have been employed to attenuate the propagation of noise from propshafts including inserts that are made from cardboard, foam, or resilient materials, such as rubber. The inserts that are typically used for a given propshaft are generally of a construction, size, mass and density to attenuate bending mode vibrations within the propshaft. While such inserts offer various advantages, several drawbacks remain.

One such drawback is the susceptibility of current propshaft assemblies to experience shell mode vibrations in the environment in which they are installed. Long aluminum propshafts have been found to produce significant noise resulting from the propshaft being excited at a shell mode natural frequency. Previously known inserts operable to attenuate propshaft tube vibrations are typically heavy and inefficient in attenuating both bending and shell mode vibrations. For long aluminum propshafts that are generally obliged to have damping treatments, these known inserts many times create concerns regarding to their mass loading effect on critical speed as well as their effectiveness on tube shell mode vibrations. It is therefore desirable to provide an improved propshaft with a lightweight however highly efficient damping treatment that is operable to attenuate propshaft tube vibrations to reduce noise transmitted to the vehicle occupants.

Furthermore, because different propshaft structures may exhibit different shell mode natural frequencies, it may be desirable to provide a propshaft assembly having an insert operable to be tuned to attenuate specific shell mode natural frequencies.

SUMMARY OF THE INVENTION

A propshaft assembly includes a shaft structure having a hollow cavity and an insert member being positioned within the hollow cavity and engaging the shaft structure. The shaft structure vibrates in response to receipt of an input of a predetermined frequency such that a shell mode anti-node is generated. The insert member is located at a position that approximately corresponds to the anti-node and has a compressive strength that is tailored to an anticipated displacement of the anti-node to thereby attenuate vibration of the shaft structure.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 5 is a partially cut-away perspective view of the propshaft and an insert member of the present invention;

FIG. 6 is a perspective view of the propshaft of FIG. 5 showing a first shell mode deformed condition;

FIG. 7 is a sectional view of the propshaft of FIG. 6 taken along line 7-7 shown in FIG. 6;

FIG. 8 is a sectional view of the propshaft of FIG. 6 taken along line 8-8 of FIG. 6;

FIG. 9 is a perspective view of the propshaft of FIG. 5 showing a second shell mode deformed condition;

FIG. 10 is a sectional view of the propshaft of FIG. 9 taken along line 10-10 shown in FIG. 9; and FIG. 11 is a sectional view of the propshaft of FIG. 9 taken along line 11-11 shown in FIG. 9.

DETAILED DESCRIPTION OF THE PREFERRED EMBODIMENTS

Figure 1:
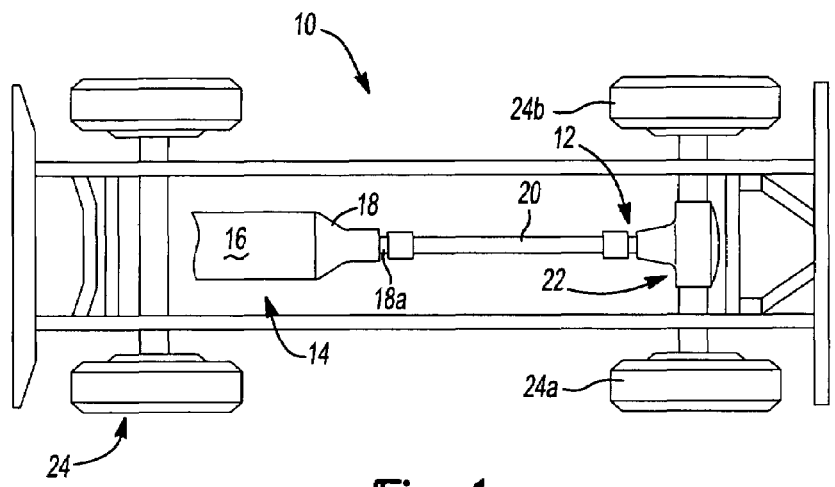
FIG. 1 is a schematic illustration of an exemplary vehicle constructed in accordance with the teachings of the present invention.

With reference to FIG. 1 of the drawings, a vehicle having a propshaft assembly that is constructed in accordance with the teachings of the present invention is generally indicated by reference numeral 10. The vehicle 10 includes a driveline 12, which is drivable via a connection to a power train 14. The power train 14 includes an engine 16 and a transmission 18. The driveline 12 includes a propshaft assembly 20, a rear axle 22 and a plurality of wheels 24. The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output 18a and a gear reduction unit. The gear reduction unit is operable for coupling the transmission input to the transmission output at a predetermined gear speed ratio. The propshaft assembly 20 is coupled for rotation with the output 18a of the transmission 18. Drive torque is transmitted through the propshaft assembly 20 to the rear axle 22 where it is selectively apportioned in a predetermined manner to the left and right rear wheels 24a and 24b, respectively.

Figure 2:
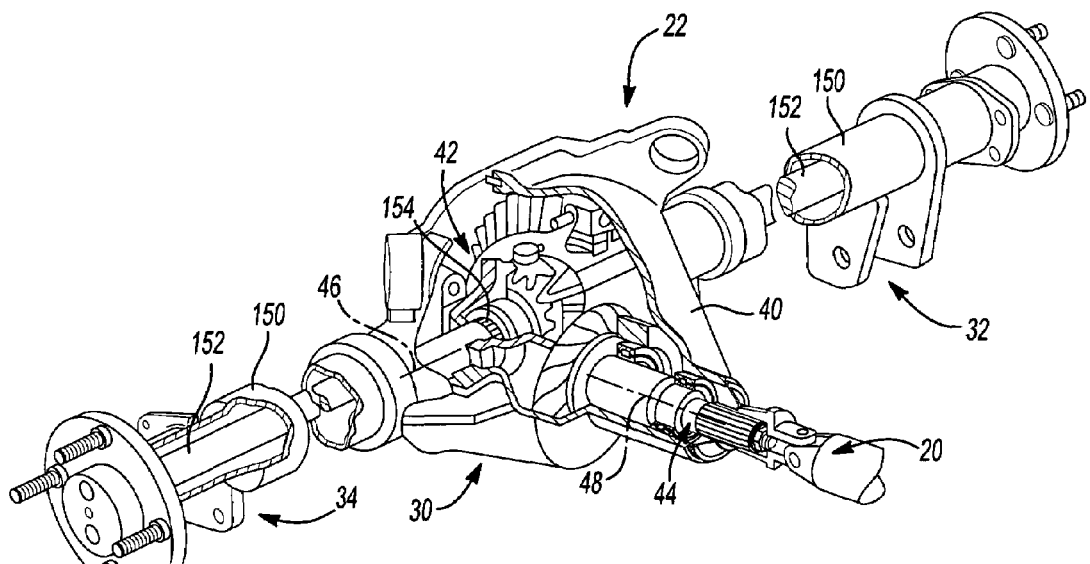
FIG. 2 is a top partially cut-away perspective view of a portion of the vehicle of FIG. 1 illustrating the rear axle and the propshaft in greater detail.
Figure 3:
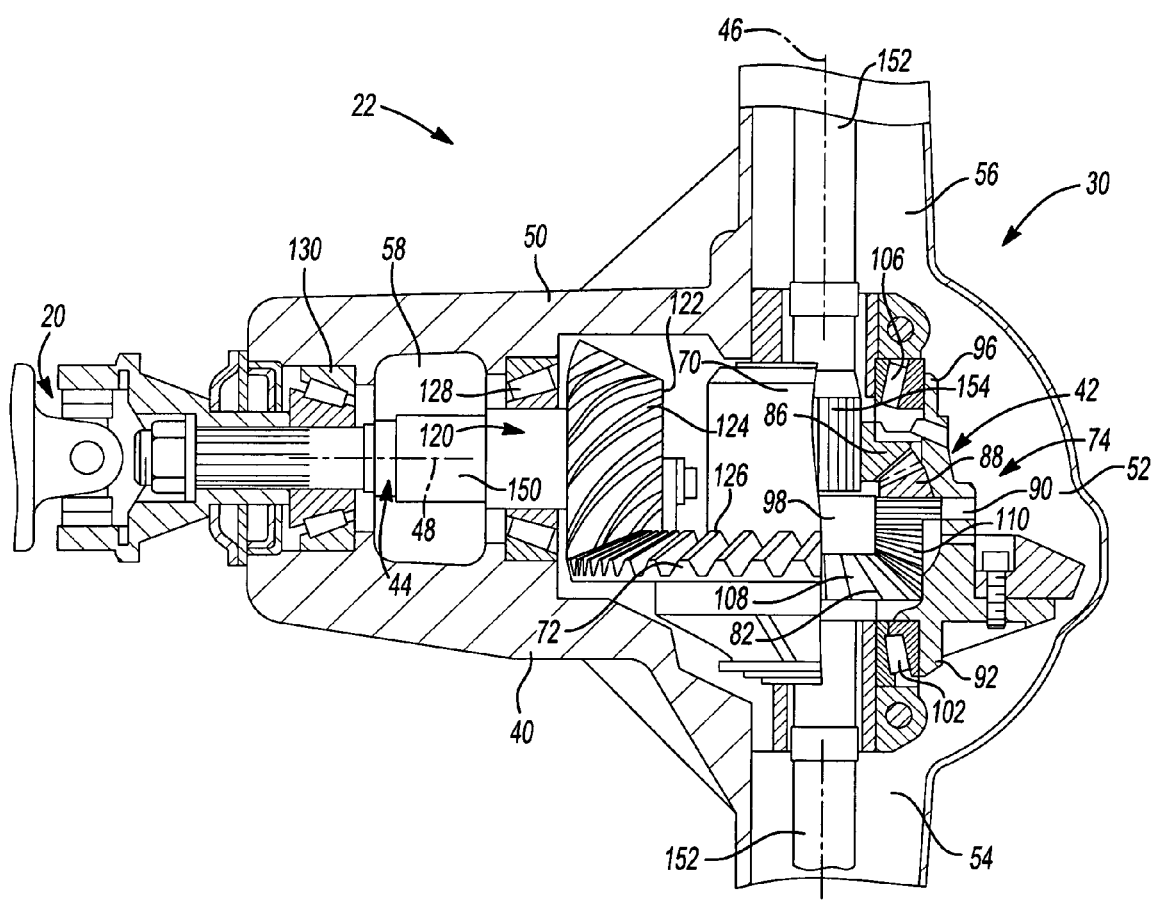
FIG. 3 is a sectional view of a portion of the rear axle and the propshaft.

With additional reference to FIGS. 2 and 3, the rear axle 22 is shown to include a differential assembly 30, a left axle shaft assembly 32, and a right axle shaft assembly 34. The differential assembly 30 includes a housing 40, a differential unit 42 and an input shaft assembly 44. The housing 40 supports the differential unit 42 for rotation about a first axis 46 and further supports the input shaft assembly 44 for rotation about a second axis 48 that is perpendicular to the first axis 46.

The housing 40 is initially formed in a suitable casting or stamping process and thereafter machined as required. The housing includes a wall member 50 that defines a central cavity 52 having a left axle aperture 54, a right axle aperture 56, and an input shaft aperture 58. The differential unit 42 is disposed within the central cavity 52 of the housing 40 and includes a case 70, a ring gear 72 that is fixed for rotation with the case 70, and a gearset 74 that is disposed within the case 70. The gearset 74 includes first and second side gears 82 and 86 and a plurality of differential pinions 88, which are rotatably supported on pinion shafts 90 that are mounted to the case 70. The case 70 includes a pair of trunnions 92 and 96 and a gear cavity 98. A pair of bearing assemblies 102 and 106 are shown to support the trunnions 92 and 96, respectively, for rotation about the first axis 46. The left and right axle assemblies 32 and 34 extend through the left and right axle apertures 54 and 56, respectively, where they are coupled for rotation about the first axis 46 with the first and second side gears 82 and 86, respectively. The case 70 is operable for supporting the plurality of differential pinions 88 for rotation within the gear cavity 98 about one or more axes that are perpendicular to the first axis 46. The first and second side gears 82 and 86 each include a plurality of teeth 108 which meshingly engage teeth 110 that are formed on the differential pinions 88.

The input shaft assembly 44 extends through the input shaft aperture 58 where it is supported in the housing 40 for rotation about the second axis 48. The input shaft assembly 44 includes an input shaft 120, a pinion gear 122 having a plurality of pinion teeth 124 that meshingly engage the teeth 126 that are formed on the ring gear 72, and a pair of bearing assemblies 128 and 130 which cooperate with the housing 40 to rotatably support the input shaft 120. The input shaft assembly 44 is coupled for rotation with the propshaft assembly 20 and is operable for transmitting drive torque to the differential unit 42.

The left and right axle shaft assemblies 32 and 34 include an axle tube 150 that is fixed to the associated axle aperture 54 and 56, respectively, and an axle half-shaft 152 that is supported for rotation in the axle tube 150 about the first axis 46. Each of the axle half-shafts 152 includes an externally splined portion 154 that meshingly engages a mating internally splined portion (not specifically shown) that is formed into the first and second side gears 82 and 86, respectively.

Figure 4:
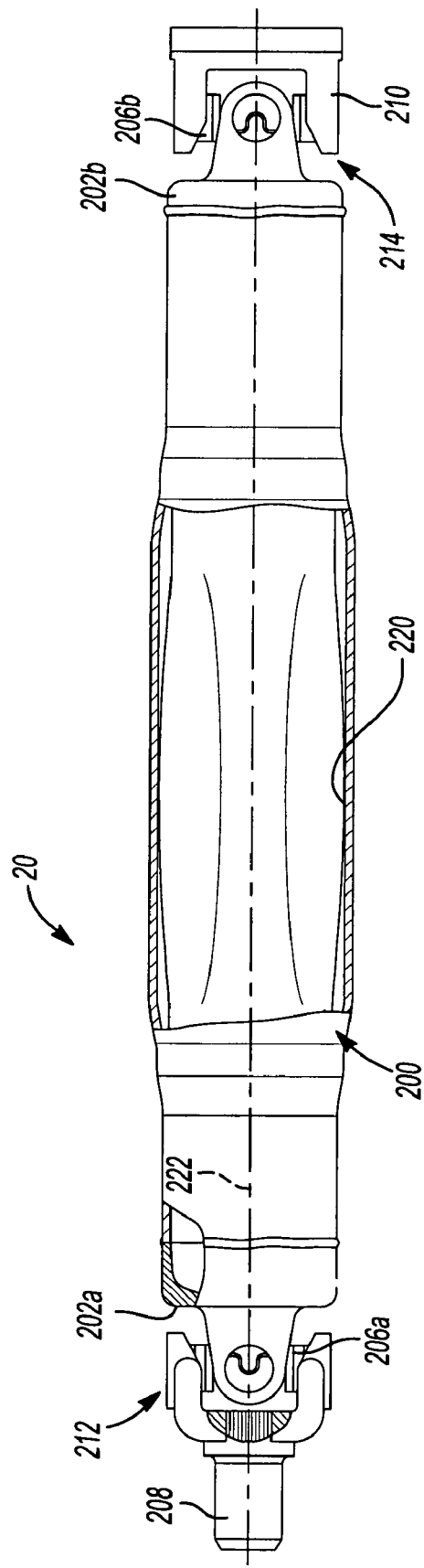
FIG. 4 is a top, partially cut away view of the propshaft.

FIG. 4 depicts the propshaft assembly 20 to include a shaft structure 200, first and second trunnion caps 202a and 202b, first and second spiders 206a and 206b, a yoke assembly 208 and a yoke flange 210. The first and second trunnion caps 202a and 202b, the first and second spider 206a and 206b, the yoke assembly 208 and the yoke flange 210 are conventional in their construction and operation and as such, need not be discussed in detail. Briefly, the first and second trunnion caps 202a and 202b are fixedly coupled to the opposite ends of the shaft structure 200, typically via a weld. Each of the first and second spiders 206a and 206b is coupled to an associated one of the first and second trunnion caps 202a and 202b and to an associated one of the yoke assembly 208 and the yoke flange 210. The yoke assembly 208, first spider 206a, and first trunnion cap 202a collectively form a first universal joint 212, while the yoke flange 210, second spider 206b and second trunnion cap 202b collectively form a second universal joint 214.

The shaft structure 200 is illustrated to be generally cylindrical, having a hollow central cavity 220 and a longitudinal axis 222. The shaft structure 200 is preferably formed from a welded seamless material, such as aluminum (e.g., 6061-T6 conforming to ASTM B-210) or steel.

FIG. 5 shows an insert member 250 may be inserted into the shaft structure 200 to attenuate shell mode vibration that is produced during transmission of rotary power by the propshaft assembly 20. In the particular example provided, a single insert member 250 is employed. The insert member 250 is a substantially cylindrical structure having a shape that is generally complimentary to the inside surface of the shaft structure 200. In the embodiment illustrated, the insert member 250 is configured as an elongated cylinder with a generally circular cross-section. The insert member 250 is further defined by a plurality of closed cells 252 interconnected to one another.

In the exemplary insert member 250, closed cells 252 are arranged in a honeycomb pattern where each cell 252 includes a substantially hexagonal cross-section. Each cell may be shaped as a right hexagonal prism having a predetermined length. A cell length "L" ranging from about 1 mm to 2 mm is contemplated to provide desirable stiffness and energy absorption characteristics for at least one shaft structure having a known length, diameter, wall thickness and material. Because the frequencies at which the shell modes are excited vary from component to component, the length and width of the cells may be varied to tune the insert to isolate certain frequencies. In similar fashion, the insert material may be changed to target certain frequencies for attenuation. One embodiment of the invention utilizes an insert member constructed from polypropylene. Other materials such as aluminum may also be used. Insert 250 is constructed from a material having a compressive strength in the range of 140-250 psi. This compressive strength is sufficient to resist the radially inward deflection of portions of the shaft structure. As such, the insert 250 increases structural stiffness of the tube to provide energy absorption during the shell vibration modes.

The insert 250 includes an outer surface 254 defining a first outer diameter when insert 250 is in a "free" or unloaded condition. The first outer diameter is greater than an inner diameter defined by an inner surface 256 of shaft structure 200. To assemble propshaft assembly 20, an adhesive 258 is applied to outer surface 254. A force is applied to insert 250 to reduce the first outer diameter to a second outer diameter less than the inner diameter of inner surface 256. Insert 250 is positioned within cavity 220 where the external force is released. Insert 250 is constructed from a substantially elastomeric material such that insert 250 tends to spring back to its original un-deformed stated. Shaft structure 200 resists this tendency and an equilibrium is reached where insert 250 biasedly engages shaft structure 200. The biased engagement as well as the adhesive bond between the insert 250 and inner surface 256 assures that insert 250 maintains a proper load-transfer-type engagement with shaft structure 300.

FIGS. 6-8 depict a first shell mode of vibration of shaft structure 200. FIGS. 9-11 depict shaft structure 200 in a deformed state while in a second shell mode. In the first shell mode depicted in FIGS. 6-8, portions 260 of shaft structure 200 move radially inwardly towards longitudinal axis 222 while portions 262 move radially outwardly from longitudinal axis 222. The maximum amplitude of deflection during a first shell mode occurs at approximately the midpoint along the length of shaft structure 200. The maximum deflection location is termed an anti-node.

FIGS. 9-11 depict the second shell mode of vibration for shaft structure 200. The second shell mode includes a first anti-node 270 and a second anti-node 272 spaced apart from one another along the length of shaft structure 200. Portions 274 located at first anti-node 270 deflect radially inwardly while portions 278 deflect radially outwardly. The radially inwardly deflecting portions are substantially diametrically opposed from one another as are the radially outwardly deflecting portions. The radially inwardly extending portions 274 are aligned along an axis Y while the radially outwardly extending portions 278 are aligned along an axis X orthogonal to axis Y.

Radially inwardly extending portions 280 are substantially diametrically opposed from one another and axially located along shaft structure 200 at second anti-node 272. The radially inwardly extending portions 280 are positioned along axis X. Radially outwardly extending portions 282 are substantially diametrically opposed to one another and aligned along axis Y. The magnitude of deflections both radially inwardly and radially outwardly at second anti-node 272 are substantially similar to the magnitude of deflections located at first anti-node 270. However, the shell mode shape of second anti-node 272 has been rotated substantially 90 degrees about longitudinal axis 222 in relation to the shape of shaft structure 200 at first anti-node 270.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. It is, therefore, intended that the invention not be limited to the particular embodiments illustrated by the drawings and described in the specification as the best mode presently contemplated for carrying out this invention, but that the invention will include any embodiments falling within the foregoing description and the appended claims.

What is claimed is:

1. In a motor vehicle having a powertrain, a driveline comprising: an axle assembly having a differential driving a pair of wheels; and a propshaft assembly for transferring rotary power from the powertrain to said differential, said propshaft assembly including a hollow shaft defining an elongated cavity and an insert member disposed within said cavity, wherein driven rotation of said propshaft assembly causes said shaft to vibrate at a first frequency to generate a first shell mode anti-node and at a second frequency to generate a second shell mode anti-node, wherein said insert member is located within said cavity and extends between portions of said shaft corresponding to said first and second shell mode anti-nodes, and wherein said insert member has a compressive strength capable of resisting deformation of said shaft at said first and second shell mode anti-nodes;

wherein said insert member is made from a plurality of closed cells that are axially aligned with a longitudinal axis of said shaft; and wherein said closed cells are shaped as hexagonal prisms.

2. The driveline of claim 1 wherein said plurality of closed cells are interconnected such that said insert member is configured as an elongated cylinder having an outer surface compressively biased into engagement with an inner surface of said cavity in said shaft.

3. The driveline of claim 1 wherein said shaft is made from aluminum.

4. A propshaft assembly comprising:
a shaft having a cavity and vibrating at a first frequency for generating a first shell mode anti-node and at a second frequency for generating a second shell mode anti-node axially displaced from said first shell mode anti-node; and
an insert member disposed within said cavity and extending between portions of said shaft approximately corresponding to said first and second shell mode anti-nodes for attenuating shell mode vibration of said shaft, and wherein said insert member is formed of closed cells interconnected to define an elongated cylinder having an outer surface compressively biased into engagement with an inner surface of said cavity to resist deformation of said shaft at said first and second shell mode anti-nodes;
wherein said insert member includes formed from a plurality of said closed cells that are axially aligned and shaped as hexagonal prisms.

5. The propshaft assembly of claim 4 wherein said insert member is a first insert located at said first shell mode anti-node and a second insert located at said second shell mode anti-node.

6. A propshaft assembly comprising:
a shaft having a hollow cavity, said shaft vibrating in response to the receipt of an input at a predetermined frequency such that a shell mode anti-node is generated; and
an insert member disposed within said cavity in compressed biased engagement with an inner surface of said cavity, said insert member is located at a position that approximately corresponds to said shell mode anti-node and has a compressive strength opposing displacement of said shell mode anti-node to thereby attenuate vibration of said shaft, wherein said insert member is formed from a plurality of closed cells that are axially aligned and shaped as hexagonal prisms.

7. The propshaft assembly of claim 6 further including sets of axially aligned hexagonal cells positioned in parallel with each other.

8. The propshaft assembly of claim 6 wherein said shaft vibrates at a frequency producing a second shell mode such that axially spaced apart first and second shell mode anti-nodes are formed, wherein said insert member is located at positions approximately corresponding to said first and second shell mode anti-node positions, and wherein said insert member is operable to attenuate said second first and second shell mode vibration.

9. The propshaft assembly of claim 8 wherein a deformed shape of said shaft at said first shell mode anti-node is substantially similar to a deformed shape of said shaft at said second shell mode anti-node.

10. The propshaft assembly of claim 9 wherein the deformed shape of said shaft at said second shell mode anti-node is rotated about a longitudinal axis of said shaft relative to the deformed shape of said shaft at said first shell mode anti-node.

11. The propshaft assembly of claim 6 wherein a deformed shape of said shaft located at said shell mode anti-node includes first and second radially inwardly deformed portions positioned substantially diametrically opposite one another.

* * * * *